United States Patent
Garcia et al.

(10) Patent No.: US 11,759,997 B2
(45) Date of Patent: Sep. 19, 2023

(54) BUILD MATERIAL SPLASH CONTROL

(71) Applicant: Hewlett-Packard Development Company, L.P., Houston, TX (US)

(72) Inventors: Andre Garcia, Poway, CA (US); Michael A. Novick, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 16/069,428

(22) PCT Filed: May 12, 2016

(86) PCT No.: PCT/US2016/032093
§ 371 (c)(1),
(2) Date: Jul. 11, 2018

(87) PCT Pub. No.: WO2017/196342
PCT Pub. Date: Nov. 16, 2017

(65) Prior Publication Data
US 2019/0054682 A1     Feb. 21, 2019

(51) Int. Cl.
*B29C 64/112* (2017.01)
*B29C 64/153* (2017.01)
(Continued)

(52) U.S. Cl.
CPC .......... *B29C 64/112* (2017.08); *B29C 64/153* (2017.08); *B29C 64/165* (2017.08);
(Continued)

(58) Field of Classification Search
CPC ......... B33Y 10/00; B33Y 30/00; B33Y 40/00; B33Y 50/02; B33Y 50/00; B29C 64/112;
(Continued)

(56) References Cited

U.S. PATENT DOCUMENTS

| | | | | |
|---|---|---|---|---|
| 6,896,839 | B2 * | 5/2005 | Kubo | B29C 64/165 264/109 |
| 7,389,154 | B2 * | 6/2008 | Hunter | B29C 64/165 700/118 |

(Continued)

FOREIGN PATENT DOCUMENTS

| | | |
|---|---|---|
| CN | 204018721 U | 12/2014 |
| CN | 105431279 A | 3/2016 |
| WO | WO-2015108546 A2 | 7/2015 |

OTHER PUBLICATIONS

Zhang et al., "Coaxial Powder Delivery System for Laser Metal Deposition Shaping", Oct. 12, 2009, 5 pages. http://ieeexplore.ieee.org/xpl/articleDetails.jsp?arnumber=5518675&queryText=.LB.3d%20OR%20LASER%20OR%20rapid.RB.%20AND%20.LB.printer.RB.%20AND%20.LB.powder.RB.%20AND%20.LB.type%20OR%20characteristics.RB.&newsearch=true.

(Continued)

*Primary Examiner* — Michael A Tolin
(74) *Attorney, Agent, or Firm* — SHOOK, HARDY AND BACON L.L.P.

(57) ABSTRACT

According to an example, a three-dimensional (3D) printer may include a first delivery device to selectively deposit first liquid droplets onto a layer of build materials and a second delivery device to selectively deposit second liquid droplets onto the layer of build materials, in which the second delivery device is positioned in relatively close proximity to the first delivery device. The 3D printer may also include a controller to identify a density at which the second liquid droplets are to be selectively deposited to control splashing of the build materials upon which the second liquid droplets are deposited and to control the second delivery device to selectively deposit the second liquid droplets at the identified density.

20 Claims, 6 Drawing Sheets

(51) Int. Cl.
| | |
|---|---|
| *B29C 64/165* | (2017.01) |
| *B29C 64/209* | (2017.01) |
| *B29C 64/35* | (2017.01) |
| *B29C 64/393* | (2017.01) |
| *B33Y 10/00* | (2015.01) |
| *B33Y 30/00* | (2015.01) |
| *B33Y 40/00* | (2020.01) |
| *B33Y 50/02* | (2015.01) |
| *B29C 64/277* | (2017.01) |
| *B29C 67/00* | (2017.01) |
| *B41J 2/505* | (2006.01) |
| *B29C 64/329* | (2017.01) |

(52) U.S. Cl.
CPC .......... *B29C 64/209* (2017.08); *B29C 64/277* (2017.08); *B29C 64/329* (2017.08); *B29C 64/35* (2017.08); *B29C 64/393* (2017.08); *B29C 67/00* (2013.01); *B33Y 30/00* (2014.12); *B33Y 40/00* (2014.12); *B33Y 50/02* (2014.12); *B41J 2/5056* (2013.01); *B33Y 10/00* (2014.12)

(58) Field of Classification Search
CPC ... B29C 64/153; B29C 64/165; B29C 64/209; B29C 64/329; B29C 64/393; B29C 67/00; B29C 64/10; B29C 64/106; B29C 64/141; B29C 64/20; B29C 64/264; B29C 64/277; B29C 64/282; B29C 64/35; B29C 64/386; B41J 2/5056

See application file for complete search history.

(56) References Cited

U.S. PATENT DOCUMENTS

| | | | |
|---|---|---|---|
| 7,497,977 | B2 | 3/2009 | Nielsen et al. |
| 8,568,124 | B2 | 10/2013 | Brunermer |
| 2002/0111707 | A1 | 8/2002 | Li et al. |
| 2005/0046957 | A1* | 3/2005 | Lai ................... B29D 11/00355 359/652 |
| 2005/0087902 | A1 | 4/2005 | Farr et al. |
| 2006/0071367 | A1 | 4/2006 | Hunter et al. |
| 2013/0076817 | A1 | 3/2013 | Olson et al. |
| 2013/0205920 | A1* | 8/2013 | Tow ...................... B29C 64/393 73/863.01 |
| 2015/0145910 | A1* | 5/2015 | Libinson ............... B41J 2/04508 347/10 |
| 2015/0251354 | A1 | 9/2015 | Bredt |
| 2015/0273765 | A1 | 10/2015 | Kato et al. |
| 2015/0283751 | A1* | 10/2015 | O'Neil .................. B29C 64/209 264/308 |
| 2015/0352639 | A1 | 12/2015 | Toyserkani et al. |
| 2015/0352790 | A1* | 12/2015 | Hadas .................. B29C 64/118 700/119 |
| 2016/0039208 | A1 | 2/2016 | Van De Vrie et al. |

OTHER PUBLICATIONS

International Search Report and Written Opinion dated Feb. 10, 2017, PCT Patent Application No. PCT/US2016/032093, filed May 12, 2016, Korean Intellectual Property Office.

* cited by examiner

BUILD MATERIAL SPLASH CONTROL

CLAIM FOR PRIORITY

The present application is a national stage filing under 35 U.S.C. § 371 of PCT application number PCT/US2016/032093, having an international filing date of May 12, 2016, the disclosure of which is hereby incorporated by reference in its entirety.

BACKGROUND

In three-dimensional (3D) printing, an additive printing process may be used to make three-dimensional solid parts from a digital model. 3D printing may be used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a three-dimensional (3D) printer, methods for implementing the 3D printer to control splashing of build materials, and a management apparatus for controlling operations of the 3D printer. The 3D printer may include a first delivery device to selectively deposit first liquid droplets onto a layer of build materials and a second delivery device to selectively deposit second liquid droplets onto the layer of build materials, in which the second delivery device is positioned in relatively close proximity to the first delivery device. In some examples, a first delivery device and/or a second delivery device may be referred to as an agent distributor. Generally speaking, when the delivery devices deposit liquid droplets, some of the build materials may be displaced with sufficient force to cause the build materials to splash. The splashing of the build materials may cause some of the build materials to be thrown in the direction of a slot of a delivery device and to attach to first delivery device near or in the slot as well as cause erosion in a layer of the build materials. In some instances the build materials attached near or in the slot of the delivery device may cause errors in the operation of the delivery device.

According to an example, the 3D printer and methods disclosed herein may prevent or minimize splashing of the build materials by the liquid droplets as the liquid droplets are deposited onto the build materials. For instance, the 3D printer and methods disclosed herein may prevent or minimize splashing of the build materials in the direction of the first delivery device resulting from deposition of second liquid droplets from the second delivery device. In addition, the 3D printer disclosed herein includes features that may minimize the introduction of build materials into or near the slot of the first delivery device to thus improve the functioning of the first delivery device. Moreover, a 3D object formed through implementation of the 3D printer and methods disclosed herein may have relatively less damage caused by the splashing of the build materials.

Figure 1A:
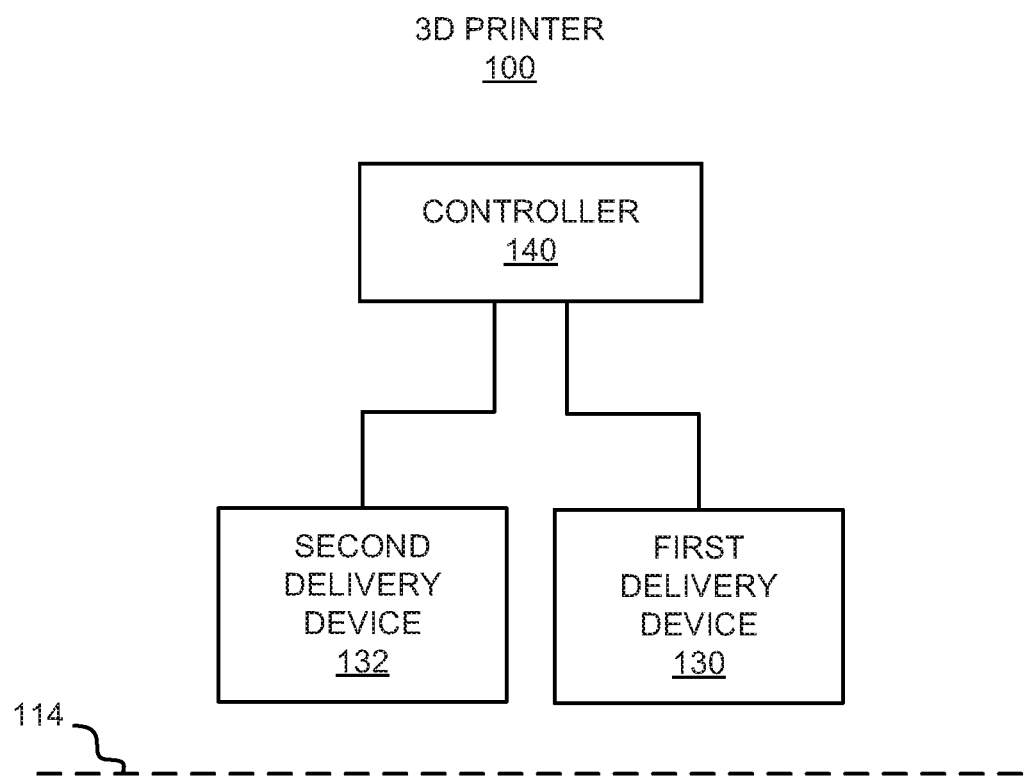
FIG. 1A shows a simplified block diagram of an example three-dimensional (3D) printer.

With reference first to FIG. 1A, there is shown a simplified block diagram of an example three-dimensional (3D) printer 100. As shown, the 3D printer 100 may include a first delivery device 130, a second delivery device 132, and a controller 140. The first delivery device 130 may selectively deposit first liquid droplets onto a layer 114 (shown as a dashed line) of build materials. In addition, the second delivery device 132 may selectively deposit second liquid droplets onto the layer 114 of build materials and may be in relatively close proximity to the first delivery device 130. For instance, the second delivery device 132 may be supported on the same printhead as the first delivery device 130.

The controller 140 may identify a density at which the second liquid droplets are to be selectively deposited to control splashing of the build materials upon which the second liquid droplets are deposited and to control the second delivery device 132 to selectively deposit the second liquid droplets at the identified density. Various manners in which the controller 140 may identify the density and control the second delivery device 132 are described in detail herein below.

Figure 1B:
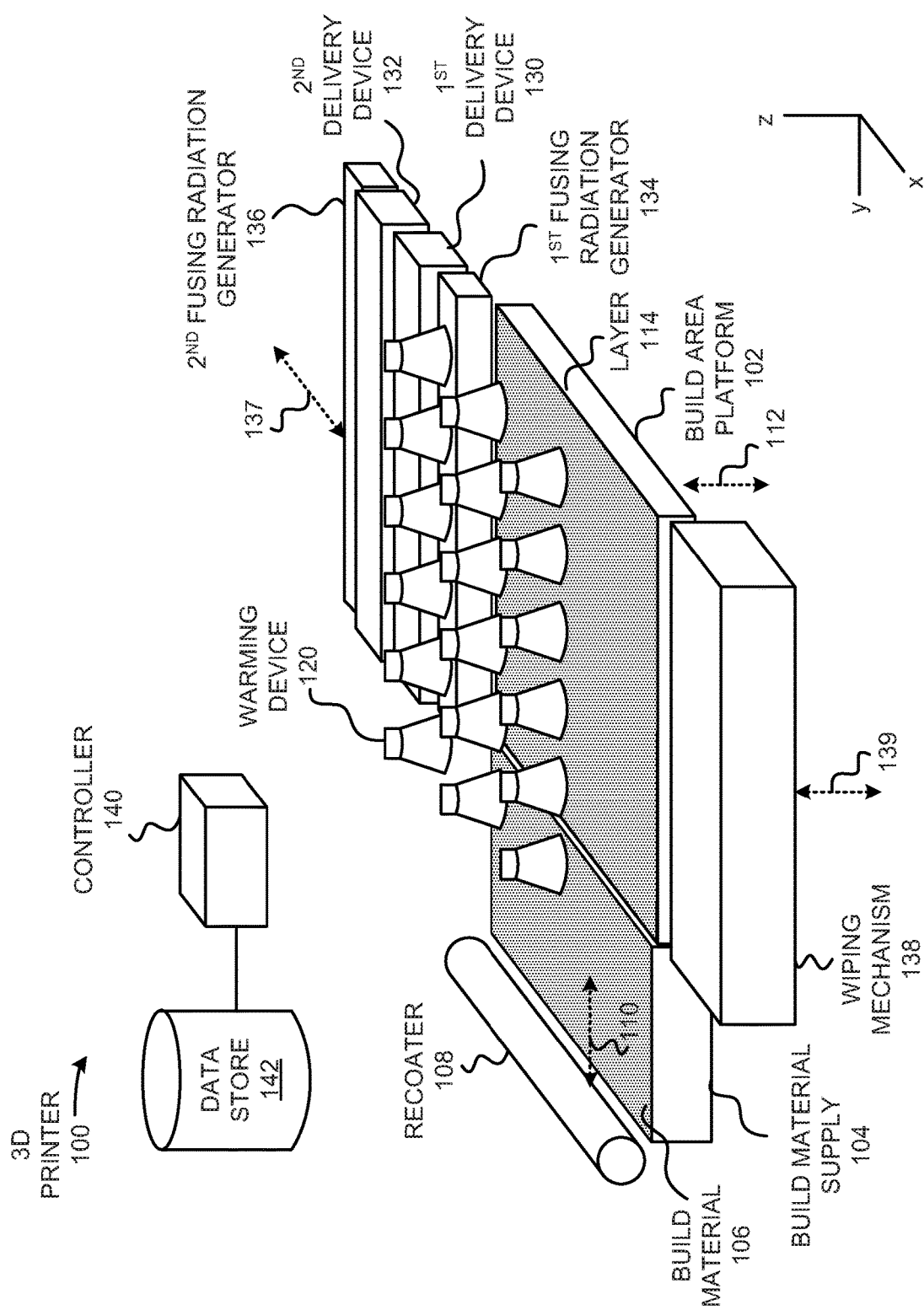
FIG. 1B shows a simplified isometric view of an example three-dimensional (3D) printer for generating, building, or printing three-dimensional parts.

With reference now to FIG. 1B, there is shown a simplified isometric view of an example 3D printer 100 for generating, building, or printing three-dimensional parts. It should be understood that the 3D printer 100 depicted in FIG. 1B may include additional components and that some of the components described herein may be removed and/or modified without departing from a scope of the 3D printer 100 disclosed herein.

The 3D printer 100 is depicted as including a build area platform 102, a build material supply 104 containing build materials 106, and a recoater 108. The build material supply 104 may be a container or surface that is to position build materials 106 between the recoater 108 and the build area platform 102. The build material supply 104 may be a hopper or a surface upon which the build materials 106 may be supplied, for instance, from a build material source (not shown) located above the build material supply 104. Additionally, or alternatively, the build material supply 104 may include a mechanism to provide, e.g., move, the build materials 106 from a storage location to a position to be spread onto the build area platform 102 or a previously formed layer of build materials 106. For instance, the build material supply 104 may include a hopper, an auger conveyer, or the like. Generally speaking, 3D objects or parts are to be generated from the build materials 106 and the build materials 106 may be formed of any suitable material including, but not limited to, polymers, metals, and ceramics. In addition, the build materials 106 may be in the form of a powder.

The recoater 108 may move in a direction as denoted by the arrow 110, e.g., along the y-axis, over the build material supply 104 and across the build area platform 102 to spread a layer 114 of the build materials 106 over a surface of the build area platform 102. The layer 114 may be formed to a substantially uniform thickness across the build area platform 102. In an example, the thickness of the layer may range from about 90 µm to about 110 µm, although thinner or thicker layers may also be used. For example, the thickness of the layer 114 may range from about 20 µm to about 200 µm, or from about 50 µm to about 200 µm. The recoater 108 may also be returned to a position adjacent the build material supply 104 following the spreading of the build materials 106. The recoater 108 may be a doctor blade, roller, a counter rotating roller or any other device suitable for spreading the build materials 106 over the build area platform 102.

The 3D printer 100 is also depicted as including a plurality of warming devices 120 arranged in an array above the build area platform 102. Each of the warming devices 120 may be a lamp or other heat source, that is to apply heat onto spread layers of the build materials 106, for instance, to maintain the build materials 106 at or above a predetermined threshold temperature. According to an example, the warming devices 120 may maintain the temperatures of the build materials 106 at a relatively high temperature that facilitates the selective fusing of the build materials 106.

The 3D printer 100 is further depicted as including a first delivery device 130 and a second delivery device 132 which may both be scanned across the build area platform 102 in both of the directions indicated by the arrow 136, e.g., along the x-axis. The first delivery device 130 and the second delivery device 132 may be, for instance, thermal inkjet printheads, piezoelectric printheads, or the like, and may extend a width of the build area platform 102. Although the first delivery device 130 and the second delivery device 132 have each been depicted in FIG. 1B as being formed of separate devices, it should be understood that each of the first delivery device 130 and the second delivery device 132 may be included on the same printhead. For instance, the first delivery device 130 may include a first set of actuators and nozzles in a printhead and the second delivery device 132 may include a second set of actuators and nozzles in the printhead.

In other examples in which the first delivery device 130 and the second delivery device 132 do not extend the width of the build area platform 102, the first delivery device 130 and the second delivery device 132 may also be scanned along the y-axis to thus enable the first delivery device 130 and the second delivery device 132 to be positioned over a majority of the area above the build area platform 102. The first delivery device 130 and the second delivery device 132 may thus be attached to a moving XY stage or a translational carriage (neither of which is shown) that is to move the first delivery device 130 and the second delivery device 132 adjacent to the build area platform 102 in order to deposit respective liquids in predetermined areas of a layer of the build materials 106.

Although not shown, the first delivery device 130 and the second delivery device 132 may each include a plurality of nozzles (or equivalently, slots) through which the respective liquids are to be ejected onto the build material layer. According to some examples, the liquids may be a fusing agent and/or a detailing agent. In these examples, the first delivery device 130 may deposit a fusing agent onto selected areas of the layer of build materials 106 and the second delivery device 132 may deposit a detailing agent onto other selected areas of the layer of build materials 106. The fusing agent may be a liquid that is to absorb fusing radiation (e.g., in the form of light and/or heat) to cause the build materials 106 upon which the fusing agent has been deposited to fuse together when the fusing radiation is applied. The detailing agent may be a liquid that may absorb significantly less of the fusing radiation as compared with the fusing agent. In one example, the detailing agent may prevent or significantly reduce the fusing together of the build materials 106 upon which the detailing agent has been deposited. In other examples, the detailing agent may be implemented to provide coloring to exterior portions of the build materials 106 that have been fused together.

Although not shown, the 3D printer 100 may include additional delivery devices, e.g., printheads, that may deposit multiple fusing agents having different radiation absorption properties with respect to each other. By way of example, the multiple fusing agents may have different colors with respect to each other, may have different chemical compositions (e.g., different reactants and/or catalysts) with respect to each other, or the like. In the example in which the 3D printer 100 may deposit multiple fusing agents, the 3D printer 100 may include multiple printheads, in which each of the multiple printheads may deposit a fusing agent having a different radiation absorption property with respect to the other fusing agents. The 3D printer 100 may likewise include additional delivery devices to deliver additional detailing agents.

According to an example, the second delivery device 132 may be a device that is able to deliver liquid droplets at variously controlled drop weights (or equivalently, drop volumes). For instance, the second delivery device 132 may include a printhead or multiple printheads available from the Hewlett Packard Company of Palo Alto, Calif. That is, for instance, the second delivery device 132 may be controlled to selectively deposit liquid droplets at chosen (or equivalently, determined) drop weights onto selected areas of the layer of build materials 106. The drop weights of the liquid droplets may be chosen to control splashing of the build materials 106 upon which the liquid droplets are deposited. In addition, the second delivery device 132 may be controlled to control the number of liquid droplets deposited per unit area of the layer of build materials 106 to control the splashing. In other words, the density at which the second liquid droplets are deposited may be controlled such that splashing of the build materials 106 caused by deposition of the second liquid droplets may be controlled (or equivalently, managed). By way of example, the second delivery device 132 may be controlled to deliver liquid droplets at a density of between around 0.5 mg/cm$^2$ to about 1.2 mg/cm$^2$. Various manners in which the densities at which the liquid droplets may be deposited as well as other features to control the splashing are described in greater detail herein below.

Following deposition of the fusing agent(s) and the detailing agent droplets onto selected areas of the layer of the build materials 106, a first radiation generator 134 and/or a second radiation generator 136 may be implemented to apply fusing radiation onto the layer of build materials 106. Particularly, for instance, the radiation generator(s) 134, 136 may be activated and moved across the layer of build materials 106, for instance, along the directions indicated by the arrow 137, to apply fusing radiation in the form of light and/or heat onto the build materials 106. Examples of the radiation generators 134, 136 may include UV, IR or near-IR curing lamps, IR or near-IR light emitting diodes (LED), halogen lamps emitting in the visible and near-IR range, or lasers with desirable electromagnetic wavelengths. The types of radiation generators 134, 136 may depend, at least in part, on the type of active material used in the fusing agent. According to an example, the first delivery device 130, the second delivery device 132, the first fusing radiation generator 134, and the second fusing radiation generator 136 may be supported on a carriage (not shown) that may be scanned over the build area platform 102 in the directions denoted by the arrow 137.

Following application of the radiation to fuse selected sections of the build materials 106 together, the build area platform 102 may be lowered as denoted by the arrow 112, e.g., along the z-axis. In addition, the recoater 108 may be moved across the build area platform 102 to form a new layer of build materials 106 on top of the previously formed layer. Moreover, the first delivery device 130 may deposit a fusing agent and the second delivery device 132 may deposit detailing agent droplets onto respective selected areas of the new layer of build materials 106. The above-described process may be repeated until a predetermined number of layers have been formed to fabricate a green body of a desired 3D part.

Additionally, following a liquid deposition operation across a build material layer or following multiple liquid deposition operations across multiple build material layers, the first delivery device 130 and the second delivery device 132 may be positioned adjacent to a wiping mechanism 138. The wiping mechanism 138 may wipe the nozzles of the first delivery device 130 and the second delivery device 132, as well as the nozzles of additional delivery devices if included in the 3D printer 100. The wiping mechanism 138 may be moved to a position in which a surface, such as a cleaning web (not shown), of the wiping mechanism 138 is in contact with the exterior surfaces of the nozzles. The wiping mechanism 138 may be moved in the z-direction as noted by the arrow 139 to remove debris such as, build materials 106, liquid, dust, etc., that may be in contact with the exterior surfaces of the first delivery device 130 and the second delivery device 132, to maintain the delivery devices 130, 132 at desired performance levels.

As further shown in FIG. 1B, the 3D printer 100 may include a controller 140 that may control operations of the build area platform 102, the build material supply 104, the recoater 108, the warming devices 120, the first delivery device 130, the second delivery device 132, the radiation generators 134, 136, and the wiping mechanism 138. Particularly, for instance, the controller 140 may control actuators (not shown) to control various operations of the 3D printer 100 components. The controller 140 may be a computing device, a semiconductor-based microprocessor, a central processing unit (CPU), an application specific integrated circuit (ASIC), and/or other hardware device. Although not shown, the controller 140 may be connected to the 3D printer 100 components via communication lines.

The controller 140 is also depicted as being in communication with a data store 142. The data store 142 may include data pertaining to a 3D part to be printed by the 3D printer 100. For instance, the data may include the locations in each build material layer that the first delivery device 130 is to deposit a fusing agent and that the second delivery device 132 is to deposit detailing droplets to form the green body of the 3D part. In one example, the controller 140 may use the data to control the locations on each of the build material layers that the first delivery device 130 and the second delivery device 132 respectively deposit the fusing agent and the detailing agent.

Figure 1C:
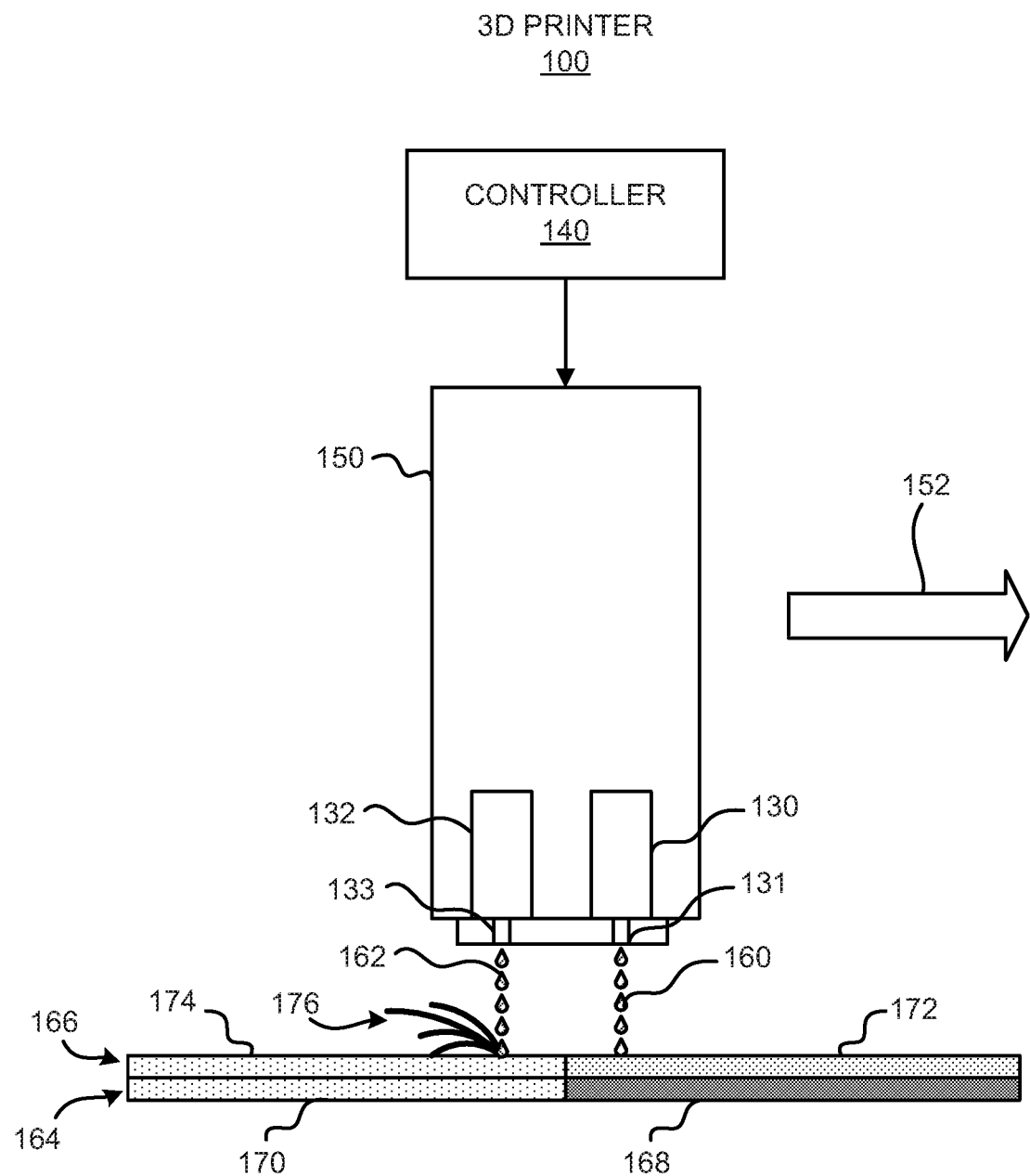
FIG. 1C shows a simplified block diagram of a few components of the example 3D printer depicted in FIG. 1B.

With reference now to FIG. 1C, there is shown a simplified block diagram of a few components of the example 3D printer 100 depicted in FIG. 1B. Particularly, the controller 140, the first delivery device 130, and the second delivery device 132 of the 3D printer 100 are shown in FIG. 1C. In contrast to FIG. 1B, however, the first liquid delivery device 130 and the second delivery device 132 are depicted as being housed in a common printhead 150, which may also be supported on a carriage (not shown). In addition, the first delivery device 130 is depicted as depositing first liquid droplets 160 through a first nozzle 131 and the second delivery device 132 is depicted as depositing second liquid droplets 162 through a second nozzle 133. As discussed above, the first liquid droplets 160 may be fusing agent droplets and the second liquid droplets 162 may be detailing agent droplets. In other examples, however, the first liquid droplets 160 and the second liquid droplets 162 may both be fusing agent droplets or detailing agent droplets.

The first liquid droplets 160 and the second liquid droplets 162 may also include various additives and/or catalysts that either enhance or reduce radiation absorption. For instance, the first liquid droplets 160 may include a radiation absorbing agent, i.e., an active material, metal nanoparticles, or the like. The first liquid droplets 160 and the second liquid droplets 162 may also include any of a co-solvent, a surfactant, a biocide, an anti-kogation agent, a dispersant, and/or combinations thereof.

Also shown in FIG. 1C are a first layer 164 of build materials 106 and a second layer 166 of build materials 106. The first layer 164 may denote a layer of build materials 106 that have been previously spread, received the first liquid droplets 160 and the second liquid droplets 162, and have received fusing radiation. Particularly, the first layer 164 is depicted as including a first section 168 of build materials 106 that previously received the first liquid droplets 160 and have at least been partially fused together and a second section 170 of build materials 106 that may have previously received the second liquid droplets 162 and have not been fused together. The second layer 166, which may denote a current layer of build materials 106, is depicted as including a third section 172 of build materials 106 that have been placed over the first section 168 and a fourth section 174 of build materials 106 that have been placed over the second section 170. In one regard, the build materials 106 in the first and third sections 168, 172 may have higher temperatures than the build materials 106 in the second and fourth sections 170, 174. The temperature of the build materials 106 in the third section 172 may be higher than the build materials 106 in the fourth section 174 because heat from the first section 168 may conduct into the build materials 106 in the third section 172.

Thus, for instance, as shown in FIG. 1C, the first liquid droplets 160 may be deposited onto build materials 106 that are at relatively higher temperatures as compared with the build materials 106 upon which the second liquid droplets 162 may be deposited. One result of this difference in temperature may be that the build materials 106 upon which the second liquid droplets 162 are deposited may be more susceptible to splashing than the build materials 106 upon which the first liquid droplets 160 are deposited. That is, as denoted by the arrow 176, some of the build materials 106 in the fourth section 174 may be displaced as the second liquid droplets 162 are deposited, in which the displacement may cause some of the build materials 106 to splash away from an upper portion of the second layer 166. However, the build materials 106 in the third section 172 may not undergo significant splashing because heat from the first section 168 may provide sufficient adhesion among the build materials 106 in the third section 172 to keep them together as the first liquid droplets 160 are deposited on those build materials 106. In similar respects, when the first liquid droplets 160 are deposited onto a layer of build materials 106 that is not positioned above a layer that has received first liquid droplets, for instance, a first couple of layers 114 provided on the build platform 102, the build materials 106 may also undergo significant splashing.

According to an example, the controller 140 may control the density at which the second delivery device 132 deposits the second liquid droplets 162 to control splashing of the build materials 106 as the printhead 150 is moved or scanned in the direction indicated by the arrow 152. For instance, the controller 140 may control the second delivery device 132 to deposit the second liquid droplets 162 at a selected density, e.g., at a selected drop weight and a selected number of droplets per unit area, that minimizes the splashing 176 of the build materials 106. By way of example, the controller 140 may select the density to be a density at which the majority of the build materials 106 that are caused to be splashed by the second liquid droplets 162 to be directed in a direction away from the first nozzle 131 as shown in FIG. 1C. That is, the density at which the second liquid droplets 162 are deposited may not be sufficiently low to prevent splashing of the build materials 106 from occurring, but may be sufficiently below a maximum density level to cause the splashed build materials 106 to be directed away from the first nozzle 131 as shown in FIG. 1C. In addition, the density may exceed a predetermined minimum density such that a desired amount of the second liquid is selectively deposited onto the build materials 106 within a desired amount of time to enable a 3D part to be accurately formed within a predetermined amount of time.

According to an example, the controller 140 may control the second delivery device 132 to deposit the second liquid droplets 162 during multiple passes over the fourth section 174 in order to deposit a predetermined amount of the second liquid droplets 162 while minimizing or eliminating splashing of the build materials 106 in the direction of the first nozzle 131. That is, for instance, the controller 140 may control the second delivery device 132 to deposit half of a requisite amount of second liquid droplets 162 during a first pass over the fourth section 172 and to deposit the remaining half during a second pass over the fourth section 172. The multiple passes may occur prior to application of fusing radiation onto the layer 166.

In addition, or alternatively, the controller 140 may select a density for the second delivery device 132 to deposit the second liquid droplets 162 to be a density that controls erosion of the second layer 166. That is, the density at which the second liquid droplets 162 are deposited may be selected to maintain the level of erosion occurring in the second layer 166 as the second liquid droplets 162 are deposited below a predetermined erosion level. The density selected to control splashing may result in the desired erosion control, which may also result in a higher quality part.

According to an example, the second delivery device 132 may be positioned with respect to the first delivery device 130 as shown in FIG. 1C to minimize splashing of the build materials 106 onto areas around the first nozzle 131. That is, because the majority of the build materials 106 may be splashed upstream from the printhead 150 with respect to the direction 152 in which the printhead 150 travels while the second liquid droplets 162 are deposited, the first delivery device 130 may be positioned downstream of the second delivery device 132 with respect to the direction 152. In other words, the second delivery device 132 may be positioned on a trailing edge side of the first delivery device 130 with respect to the direction 152. The second delivery device 132 may also be positioned on the trailing edge side of each of additional delivery devices in the 3D printer 100 with respect to the direction 152.

In addition, to further limit or prevent the introduction of debris onto the areas around the first nozzle 131, the wiping mechanism 138 may wipe the area around the first nozzle 131 prior to wiping the area around the second nozzle 133. That is, as shown in FIG. 1B, the wiping mechanism 136 may be positioned further downstream of the second delivery device 132 with respect to the first delivery device 130 such that the first nozzle 131 may be wiped prior to the second nozzle 133 as the first delivery device 130 and the second delivery device 132 are moved in the direction 137, i.e., in the positive x-direction.

Still further, to minimize or reduce splashing of the build materials 106, the controller 140 may control the warming devices 120 to apply heat at a sufficiently high level to cause the layer 114 of the build materials 106 to partially fuse, e.g., skin over. That is, the controller 140 may control the warming devices 120 to apply sufficient levels of heat to cause the build materials 106 on a top surface of an exposed layer 114 to partially melt and flow without causing the build materials 106 in the layer 114 to fuse together and while still enabling the liquid droplets 160, 162 to flow through the top layer. The level to which the warming devices 120 are to apply heat sufficient to reach this condition may be determined through testing and may differ for different types of build materials 106.

As a further example, the controller 140 may control the first delivery device 130 to deliver a relatively small amount of first liquid droplets 160 onto build materials 106 to heat up the build materials 106 prior to controlling the second delivery device 132 to deliver the second liquid droplets 162. In this example, the first delivery device 130 may be controlled to deliver a sufficiently small amount of first liquid droplets 160 to prevent the build materials 106 from fusing together while also increasing the temperature of the build materials 106. The amount of first liquid droplets 160 to be deposited prior to deposition of the second liquid droplets 162 may be determined through testing and may differ for different types of build materials 106. Additionally, the increase in temperature of the build materials 106 afforded by the first liquid droplets 160 may reduce the splashing of the build materials 106 during deposition of the second liquid droplets 162.

Figure 2:
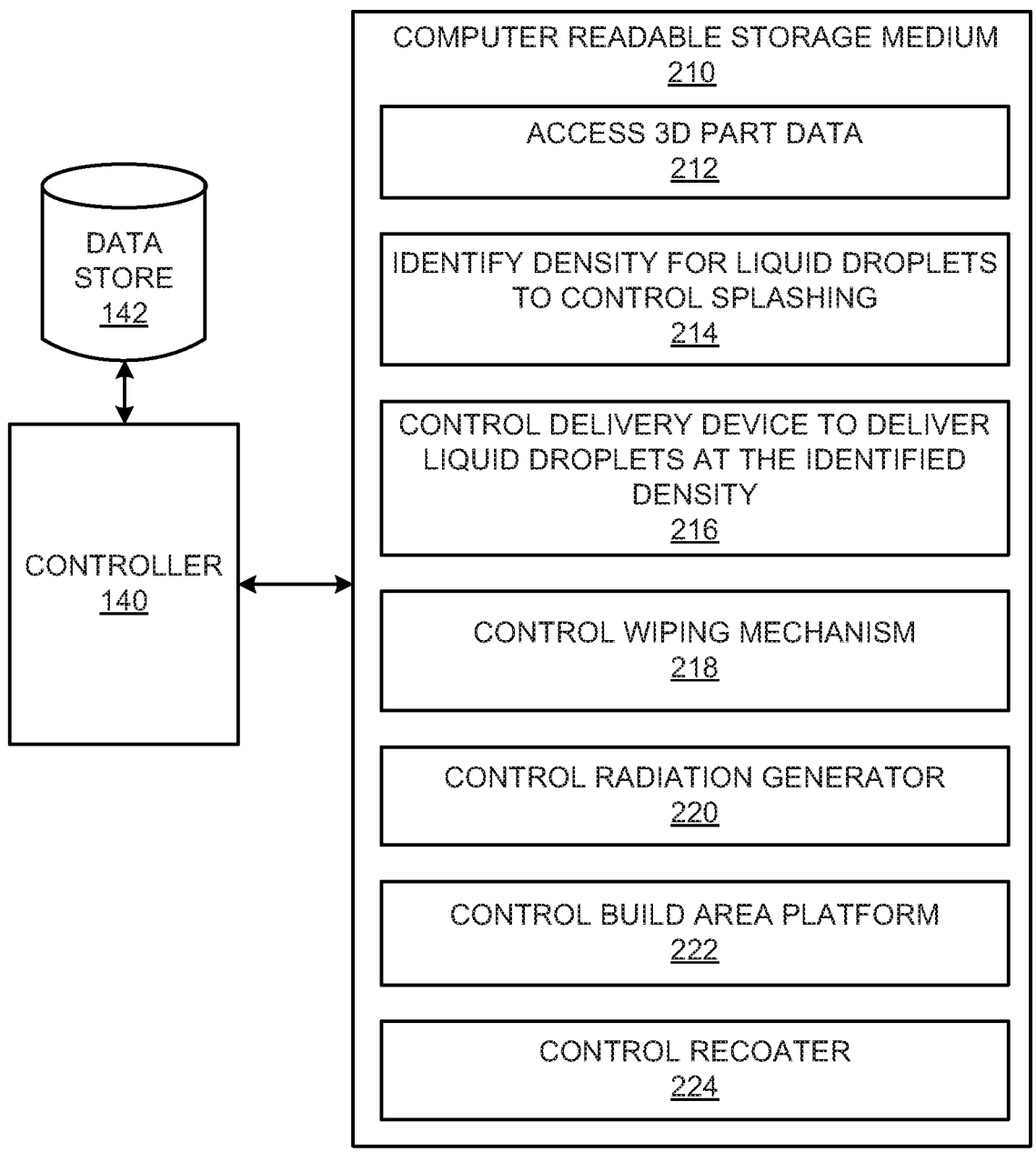
FIG. 2 shows a simplified block diagram of an example management apparatus that may be implemented in the 3D printer depicted in FIG. 1B.

Turning now to FIG. 2, there is shown a simplified block diagram of an example management apparatus 200 that may be implemented in the 3D printer depicted in FIG. 1B. In one example, the management apparatus 200 may form part of the 3D printer 100 depicted in FIG. 1B. For instance, the management apparatus 200 may be a command module or other control system of the 3D printer 100. It should be understood that the management apparatus 200 depicted in FIG. 2 may include additional components and that some of the components described herein may be removed and/or modified without departing from a scope of the management apparatus 200 disclosed herein.

The management apparatus 200 depicted in FIG. 2 is shown as including a controller 140 and a data store 142, which may be the same as the controller 140 and the data store 142 depicted in and described above with respect to FIG. 1B. As such, the controller 140 and the data store 142 depicted in FIG. 2 are not described in detail and instead, the descriptions of the controller 140 and the data store 142 provided above with respect to the 3D printer 100 are intended to also describe these components with respect to the management apparatus 200.

As shown in FIG. 2, the management apparatus 200 may include a computer readable storage medium 210 on which is stored machine readable instructions 212-224 that the controller 140 may execute. More particularly, the controller 140 may fetch, decode, and execute the instructions 212-224 to access data pertaining to a 3D part to be printed 212, identify a density at which liquid droplets are to be selectively deposited to control splashing 214, control a delivery device to deliver the liquid droplets at the identified density 216, control a wiping mechanism 218, control a radiation generator 220, control a build area platform 222, and control a recoater 224. As an alternative or in addition to retrieving and executing instructions, the controller 140 may include one or more electronic circuits that include components for performing the functionalities of the instructions 212-224. In any regard, and as discussed above, the controller 140 may communicate instruction signals to the various components of the 3D printer 100 via communication lines such that the components may operate in the manners described herein.

The computer readable storage medium 210 may be any electronic, magnetic, optical, or other physical storage device that contains or stores executable instructions. Thus, the computer readable storage medium 210 may be, for example, Random Access Memory (RAM), an Electrically Erasable Programmable Read-Only Memory (EEPROM), a storage device, an optical disc, and the like. The computer readable storage medium 210 may be a non-transitory machine-readable storage medium, where the term "non-transitory" does not encompass transitory propagating signals.

Figure 3:
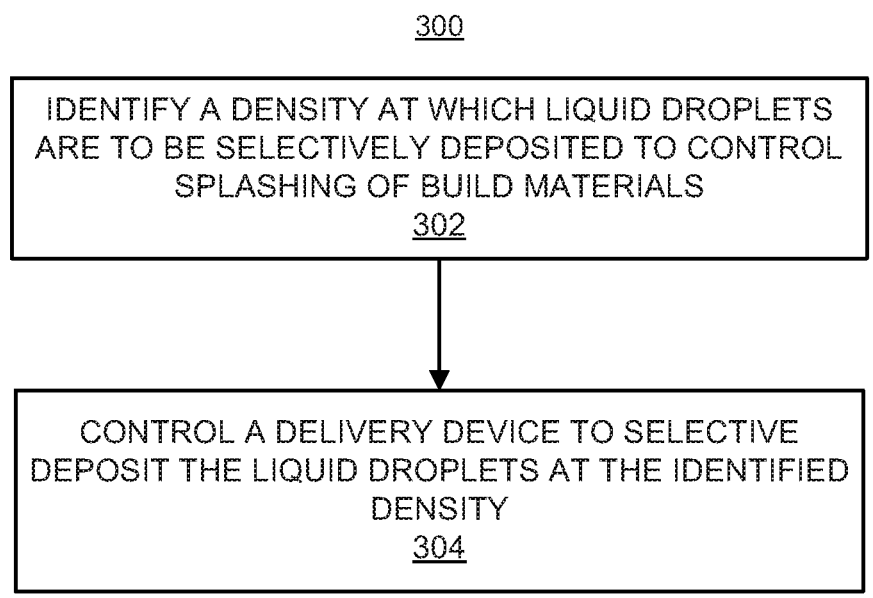
FIGS. 3 and 4, respectively, depict example methods for controlling splashing of build materials upon which liquid droplets are deposited.
Figure 4:
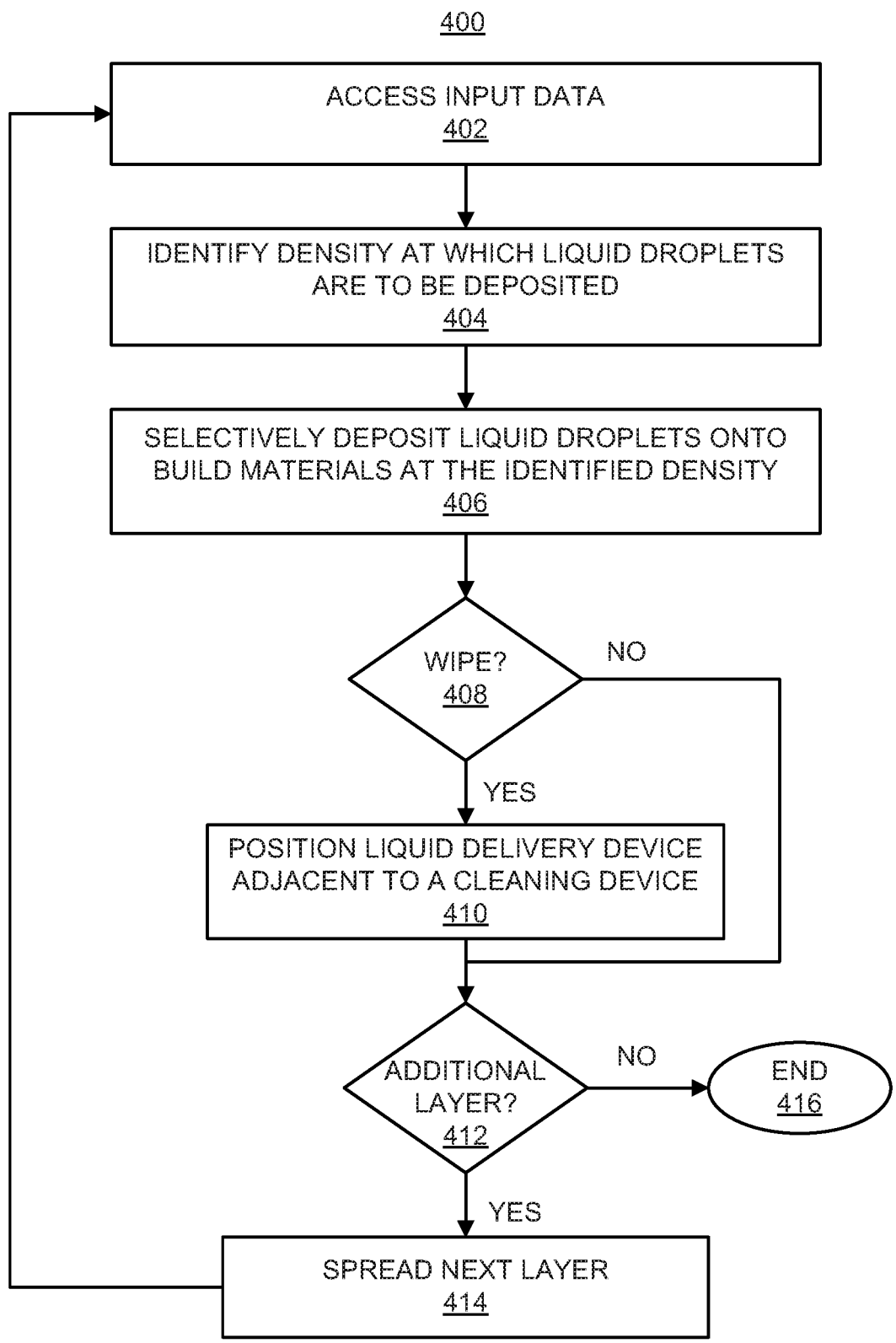

Various manners in which the management apparatus 200 may be implemented are discussed in greater detail with respect to the methods 300 and 400 respectively depicted in FIGS. 3 and 4. Particularly, FIGS. 3 and 4, respectively, depict example methods 300 and 400 for controlling splashing of build materials 106 upon which liquid droplets are deposited. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the 3D printer 100 illustrated in FIG. 1B and the management apparatus 200 illustrated in FIG. 2 for purposes of illustration. It should, however, be clearly understood that 3D printers and management apparatuses having other configurations may be implemented to perform either or both of the methods 300 and 400 without departing from the scopes of the methods 300 and 400.

Prior to execution of either of the methods 300 and 400 or as parts of the methods 300 and 400, the controller 140 may execute instructions 212 stored on the machine-readable medium 210 to access data pertaining to a 3D part that is to be printed. By way of example, the controller 140 may access data stored in the data store 142 pertaining to a 3D part that is to be printed. The controller 140 may determine the number of layers of build material 106 that are to be formed and the locations at which first liquid droplets 160 are to be deposited by the first delivery device 130 on each of the respective layers of build material 106 in order to print the 3D part. The controller 140 may further determine the locations at which the second liquid droplets 162 are to be deposited by the second delivery device 132 on each of the respective layers of build material 106 in order to print the 3D part as well as the timings at which the fusing radiation generator(s) 134, 136 are to be employed. In other examples, however, a processing device (not shown) outside of the 3D printer 100 may execute instructions to access the 3D part data and to determine the locations at which the first liquid droplets 160 and the second liquid droplets 162 are to be deposited as well as other processes to be performed in the formation of the 3D part. In these examples, the processing device may communicate this information to the controller 140 and the controller 140 may implement this information in executing either or both of the methods 300 and 400.

With reference first to FIG. 3, at block 302, a density at which liquid droplets 162 are to be selectively deposited onto a layer of build materials 106 by a delivery device 132 to control splashing of the build materials 106 upon which the liquid droplets 162 are deposited may be identified. For instance, the controller 140 may execute the instructions 214 to identify the density at which the delivery device 132 is to selectively deposit the liquid droplets 162. By way of example, the controller 140 may identify a density, e.g., a combination of drop weight of the liquid droplets and a number of liquid droplets deposited per unit area, for the liquid droplets 162 that may minimize the splashing of build materials 106 upon which the liquid droplets 162 are deposited in the direction of the nozzle 131 of an adjacent delivery device 130. In addition, the identified density may include a drop weight that is below the maximum drop weight at which the delivery device 132 may deliver the liquid droplets 162 and is above a predetermined minimum density level. The predetermined minimum density level may be a density level that enables a desired amount of the liquid droplets 162 to be selectively deposited onto the build materials 106 within a desired amount of time to enable a 3D part to be accurately formed within a predetermined amount of time. In addition, the predetermined minimum density level may be based upon a selected print mode of the 3D printer 100. That is, the predetermined minimum density level may be higher for a higher quality print mode as compared with a lower quality print mode.

According to an example, the densities at which the liquid droplets 162 may be deposited onto multiple types of build materials 106 and under multiple types of conditions to control splashing may be determined, for instance, through testing, modeling, and/or interpolation. That is, for instance, testing may be performed on a single type or on multiple types of build materials 106 to determine the densities at which deposition of the liquid droplets 162 result in desirable splashing conditions. The testing may result in different densities to be used for different types of build materials 106 as well as for different types of liquid droplet materials. In one example, information pertaining to (e.g., correlations between) the different densities, the different types of build materials 106, and different types of liquid droplet materials, may be stored in the data store 142 and the controller 140 may identify the density at block 302 from the stored information. In other examples, the controller 140 may identify the density at block 302 from information available over a network or from information inputted by a user.

At block 304, the delivery device 132 may be controlled to selectively deposit the liquid droplets 162 at the identified density. For instance, the controller 140 may execute the instructions 216 to control the delivery device 132 to selectively deposit the liquid droplets 162 as the delivery device 132 is scanned across a layer of the build materials 106. In other words, the controller 140 may control the delivery device 132 to deposit the liquid droplets 162 at the identified density onto selected areas of the layer.

With reference now to FIG. 4, at block 402, input data may be accessed. For instance, the controller 140 may execute the instructions 212 to access the input data. As discussed above, the input data may identify the locations at which the liquid droplets 162 are to be deposited onto a layer 166 of the build materials 106.

At block 404, a density at which the liquid droplets 162 are to be deposited may be identified. The controller 140 may execute the instructions 214 to identify the density in any of the manners discussed above with respect to block 302 in FIG. 3.

At block 406, the delivery device 132 may be controlled to selectively deposit the liquid droplets 162 at the identified density. For instance, the controller 140 may execute the instructions 216 to control the delivery device 132 to selectively deposit the liquid droplets 162 as the delivery device 132 is scanned across a layer of the build materials 106 as discussed above with respect to block 304 in FIG. 3. The controller 140 may control the delivery device 132 to selectively deposit the liquid droplets 162 over multiples passes of the delivery device 132 in instances in which, for instance, the density at which the liquid droplets 162 during a single pass is insufficient to meet a predetermined minimum density level, e.g., the liquid droplets 162 deposited during a single pass is of insufficient density to sufficiently cool the build materials 106 during application of fusing radiation. Following block 406, the controller 140 may execute the instructions 220 to control the radiation generator(s) 134, 136 to apply radiation on the layer of build materials 106 to selectively fuse the build materials 106 upon which first liquid droplets 160 have been deposited.

At block 408, the controller 140 may determine whether to wipe a nozzle 133 of the delivery device 132. In response to a determination that the nozzle 133 is to be wiped, the controller 140 may control a carriage (not shown) upon which the delivery device 132 is supported to move to a location adjacent to a wiping mechanism 138 as indicated at block 410. In addition, the controller 140 may control the carriage to move in a direction that causes a nozzle 131 other than the nozzle 133 of the delivery device 132 to be wiped prior to the nozzle 133 being wiped. That is the nozzle 133 of the delivery device 132 may be wiped last among all of the nozzles in the 3D printer 100. The controller 140 may further execute the instructions 218 to control the wiping mechanism 138 to be moved at an appropriate time to perform the wiping operations.

However, in response to a determination at block 408 that the nozzle 133 of the delivery device 132 is not to be wiped and/or following block 410, the controller 140 may determine whether an additional layer of build materials 106 is to be formed, as indicated at block 412. The controller 140 may make this determination, for instance, based upon accessed information regarding the 3D part to be printed. In response to a determination that an additional layer is to be formed, a next layer of build materials 106 may be spread on top of the previous layer 160, as indicated at block 414. For instance, the controller 140 may execute the instructions 222 to control the build area platform 102 to be moved downward and may execute the instructions 224 to control the recoater 108 to spread additional build materials 106 across the previous layer. In addition, blocks 402-414 may be repeated until no additional layers are to be formed, at which point the method 400 may end, as indicated at block 416.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Experiments using different print densities of liquid droplets deposited from a second delivery device that is positioned adjacent to a first delivery device as a printhead was moved in a scanning direction have established that at sufficiently low print densities, build materials (such as PA12) are splashed mainly in a direction opposite the scanning direction. For instance, splashing in this manner was found to occur when the print density of the liquid droplets deposited from the second delivery device was about 0.8 mg/cm$^2$. That is, the majority of the build material plume caused by the splashing landed upstream of the printhead scanning direction. However, when the print density of the liquid droplets deposited from the second delivery device was raised to about 1.6 mg/cm$^2$, a large portion of the splashed build materials were directed toward the printhead scanning direction. That is, the build material plume caused by the splashing landed both upstream and downstream of the printhead scanning direction.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   identifying, by a controller, a first number of liquid droplets of a first agent per unit area of a layer of build material powder to be deposited onto the layer of the build material powder by a first delivery device in a printhead to minimize splashing of the build material powder, wherein the first number of liquid droplets of the first agent is selected based on a type of the first agent;

identifying, by the controller, a second number of liquid droplets of a second agent per unit area of the layer of the build material powder to be deposited onto the layer of the build material powder by a second delivery device in the printhead, wherein the second number of liquid droplets of the second agent is selected based on a type of the second agent;

controlling, by the controller, the second delivery device in the printhead to deposit the second number of liquid droplets of the second agent onto the layer of the build material powder, wherein the second delivery device is positioned next to the first delivery device in the printhead; and after the second delivery device has deposited the second number of liquid droplets of the second agent onto the layer of the build material powder, controlling, by the controller, the first delivery device to deposit the first number of liquid droplets of the first agent onto the layer of the build material powder when the printhead is moved in a direction in which the first delivery device is trailing the second delivery device and not when the printhead is moved in an opposite direction.

2. The method according to claim 1, further comprising:
selecting a drop weight for each liquid droplet of the first number of liquid droplets to minimize the splashing of the build material powder onto a slot of the second delivery device, wherein the second delivery device ejects the second number of liquid droplets through the slot.

3. The method according to claim 2, wherein the second agent is a fusing agent and the first agent is a detailing agent.

4. The method according to claim 1, further comprising:
controlling the first delivery device and the second delivery device to be positioned adjacent to a cleaning device, wherein the cleaning device is to clean the second delivery device prior to cleaning the first delivery device.

5. The method according to claim 1, wherein the first number of liquid droplets of the first agent per unit area at which the first agent is to be deposited onto the layer of the build material powder is selected from data pertaining to correlations between a plurality of numbers of droplets per unit area at which the first agent is to be deposited and a plurality of factors corresponding to the build material powder and the first agent.

6. The method according to claim 1, wherein the first agent and the second agent are different.

7. The method according to claim 1, wherein the first agent and the second agent are the same.

8. A three-dimensional (3D) printer comprising:
a printhead comprising a first delivery device to selectively deposit a first number of first liquid droplets of a first agent onto a layer of build material powder, and a second delivery device to selectively deposit a second number of second liquid droplets of a second agent onto the layer of the build material powder, wherein the second delivery device is positioned next to the first delivery device; and a controller configured to:
identify a specific number of droplets of the second agent per unit area of the layer of the build material powder to be deposited onto the layer of the build material powder to minimize splashing of the build material powder, wherein the specific number of droplets of the second agent per unit area of the layer of the build material powder is identified based on a type of the second agent;

control the first delivery device to deposit the first agent onto the layer of the build material powder;

after the first delivery device has deposited the first agent onto the layer of the build material powder, control the second delivery device to deposit the identified specific number of droplets of the second agent onto the layer of the build material powder when the printhead is moved in a direction in which the second delivery device is trailing the first delivery device and not when the printhead is moved in an opposite direction.

9. The 3D printer according to claim 8, wherein the first delivery device comprises a first slot through which the first number of the first liquid droplets of the first agent are ejected and wherein the controller is further configured to select a drop weight for each drop of the second number of the second liquid droplets of the second agent to minimize splashing of the build material powder onto the first slot of the first delivery device.

10. The 3D printer according to claim 8, wherein the controller is further configured to increase a temperature of the build material powder prior to deposition of either or both of the first agent and the second agent.

11. The 3D printer according to claim 8, wherein the specific number of droplets per unit area of the second agent is determined to reduce erosion of the layer of the build material powder.

12. The 3D printer according to claim 8, further comprising: a data store, wherein the data store contains data pertaining to correlations between a plurality of numbers of droplets per unit area at which the second agent is to be deposited and a plurality of factors corresponding to the build material powder and the second agent; and wherein the controller is further configured to select the specific number of droplets per unit area of the layer of the build material powder at which the second agent is to be deposited onto the layer of the build material powder based on the data pertaining to the correlations contained in the data store.

13. The 3D printer according to claim 8, wherein the first delivery device and the second delivery device are supported on a carriage, wherein the controller is further configured to control the second delivery device to deposit the second agent when the carriage moves in the particular direction in which the second delivery device is positioned on a trailing edge side of the first delivery device.

14. The 3D printer according to claim 13, further comprising a wiper mechanism positioned downstream from the second delivery device along the particular direction and wherein the wiper mechanism is to wipe the first delivery device prior to wiping the second delivery device.

15. The 3D printer according to claim 8, wherein the first agent is a fusing agent and the second agent is a detailing agent.

16. The 3D printer according to claim 8, wherein the first agent and the second agent are different.

17. The 3D printer according to claim 8, wherein the first agent and the second agent are the same.

18. A non-transitory computer readable medium storing machine readable instructions that, when executed by a processor, cause the processor to:
identify a first number of liquid droplets of a first agent per unit area of a layer of build material powder to be deposited onto the layer of the build material powder by a first delivery device in a printhead to minimize splashing of the build material powder, wherein the first number of liquid droplets per unit area is selected based on a type of the first agent;

control a second delivery device in the printhead to deposit a second number of liquid droplets of a second agent onto the layer of the build material powder, wherein the second delivery device is positioned next to the first delivery device in the printhead; and after the second delivery device has deposited the second number of liquid droplets of the second agent onto the layer of the build material powder, control the first delivery device to deposit the first number of liquid droplets of the first agent onto the layer of the build material powder when the printhead is moved in a direction in which the first delivery device is trailing the second delivery device and not when the printhead is moved in an opposite direction.

19. The non-transitory computer readable medium according to claim 18, wherein the machine readable instructions are executable to further cause the processor to:

select a drop weight for each drop of the first number of liquid droplets of the first agent to minimize splashing of the build material powder onto a slot of the second delivery device, wherein the second delivery device ejects the second liquid droplets through the slot.

20. The non-transitory computer readable medium according to claim 18, wherein the first agent is a fusing agent and the second agent is a detailing agent.

\* \* \* \* \*